US009813412B1

(12) United States Patent
Yang et al.

(10) Patent No.: US 9,813,412 B1
(45) Date of Patent: Nov. 7, 2017

(54) SCANNING OF PASSWORD-PROTECTED E-MAIL ATTACHMENT

(71) Applicants: Guangxiang Yang, Nanjing (CN); Zhichao Ding, Nanjing (CN)

(72) Inventors: Guangxiang Yang, Nanjing (CN); Zhichao Ding, Nanjing (CN)

(73) Assignee: TREND MICRO INC., Shibuya-Ku, Tokyo (JP)

( * ) Notice: Subject to any disclaimer, the term of this patent is extended or adjusted under 35 U.S.C. 154(b) by 0 days.

(21) Appl. No.: 14/810,383

(22) Filed: Jul. 27, 2015

(51) Int. Cl.
*G06F 7/04* (2006.01)
*H04L 29/06* (2006.01)
*H04L 12/58* (2006.01)

(52) U.S. Cl.
CPC ............ *H04L 63/083* (2013.01); *H04L 51/08* (2013.01); *H04L 63/145* (2013.01)

(58) Field of Classification Search
CPC ......... G06F 2221/2107; G06F 21/6209; H04L 12/584
USPC .......................................................... 726/7
See application file for complete search history.

(56) References Cited

U.S. PATENT DOCUMENTS

| | | | | |
|---|---|---|---|---|
| 2002/0007453 A1* | 1/2002 | Nemovicher | ....... | H04L 12/5875 713/155 |
| 2005/0192966 A1* | 9/2005 | Hilbert | .............. | G06F 17/30067 |
| 2006/0230461 A1* | 10/2006 | Hauser | ................... | H04L 12/58 726/27 |
| 2007/0106904 A1* | 5/2007 | Christoff | .............. | G06Q 10/107 713/183 |
| 2008/0320417 A1* | 12/2008 | Begley | ................. | G06Q 10/107 715/822 |
| 2010/0161961 A1* | 6/2010 | Beigelman | .......... | H04L 63/0428 713/152 |
| 2011/0016530 A1* | 1/2011 | Fossen | ................... | G06F 21/564 726/24 |
| 2013/0061307 A1* | 3/2013 | Livne | .................... | H04W 12/06 726/7 |

(Continued)

OTHER PUBLICATIONS

Moon et al, Data Security using Data Hiding, 2007, IEEE, pp. 247-251.*

(Continued)

*Primary Examiner* — Christopher Brown
*Assistant Examiner* — Jenise Jackson
(74) *Attorney, Agent, or Firm* — Beyer Law Group LLP (57) ABSTRACT

A computer analyzes a message attachment protected by a password. The message is intercepted from a sender before the message reaches the recipient. The computer cannot open, decrypt, unpack or decompress the attachment because the computer cannot parse the password. The message is modified to render the attachment unusable by the recipient and a URL is added. After the modified message is sent to the recipient, the computer receives the correct password from the recipient allowing the computer to open the attachment and perform anti-malware scanning. If malicious, the attachment is quarantined, deleted or blocked. If not malicious, the attachment (password-protected or not) is downloaded to the recipient, sent by e-mail or text message, or made available on a Web site. The recipient may be a mobile device or computer. Software may be part of an e-mail server, part of a mail transfer agent, or part of a separate computer.

9 Claims, 9 Drawing Sheets

(56) References Cited

U.S. PATENT DOCUMENTS

2013/0145483 A1* 6/2013 DiMuro ................. G06F 21/60
726/28

OTHER PUBLICATIONS

Price, Protecting Privacy Credenitals from Phishing and Spyware Attacks, Mar. 20, 2007, IEEE, pp. 167-174.*

* cited by examiner

FIG. 7
Implementation Example

SCANNING OF PASSWORD-PROTECTED E-MAIL ATTACHMENT

FIELD OF THE INVENTION

The present invention relates generally to antivirus scanning of computer files. More specifically, the present invention relates to determining the correct password in order to open and scan an attachment to an e-mail message.

BACKGROUND OF THE INVENTION

A variety of antivirus techniques are used to scan, execute or otherwise analyze computer files, hard disks, e-mail messages, instant messages, etc. Occasionally, this information that needs to be scanned (or executed) is protected by a password or other security mechanism and the information cannot be opened or executed.

In particular, attachments to e-mail messages and the like may be protected by a password, and this password must be provided in order to open the attachment so that it can be analyzed for computer viruses or other types of malware. Generally, certain antivirus software is able to parse the body of an e-mail message in order to extract the password, and then use this password to open the attachment. But, certain types of passwords or techniques for presenting a password are problematic for antivirus software; the software cannot read or extract the password and thus cannot open the attachment in order to analyze it.

For instance, regular expression matching software is often used to extract the password from the body of an e-mail message. This technique can extract passwords for most e-mail messages such as when the phrase "The password is: pwdforzip" appears in the body of the message. The technique is able to parse this language and determine that the password is in fact "pwdforzip".

There are some e-mail messages, however, in which the password is provided in a more cryptic manner. For instance, the phrase may be "The password is: 123pwdforzip456. Please remove the numerals when entering the password." Regular expression software will determine that the password is "123pwdforzip456," when in fact the actual password is "pwdforzip". The antivirus software will not be able to open the attachment and will not be able to analyze it.

Accordingly, new techniques and systems are desired that will enable antivirus software to determine the correct password provided in an e-mail message (or similar) in order to open an attachment and analyze it.

SUMMARY OF THE INVENTION

To achieve the foregoing, and in accordance with the purpose of the present invention, a method and system is disclosed that enables antivirus software to determine the correct password in order to open a password-protected attachment for analysis.

The present invention utilizes a man-machine interactive approach that can determine the correct password even if that password is obscured by other numbers, letters, images etc., and even if the password is accompanied by instructions that require a human to read and understand in order to determine the correct password. Passwords that otherwise cannot be automatically identified by software can now be determined with human assistance. Therefore, embedded files, attachments, etc. are able to be analyzed by antivirus software before delivery to the recipient. The invention may be implemented upon an e-mail gateway, upon a stand-alone hardware appliance, and may form part of the mail transfer agent (MTA) or may be a separate software module. The present invention increases the detection rate of malicious e-mail messages or of their attachments.

In a first embodiment, a computer is able to analyze an attachment to a message or file that is embedded within the message that has been protected by a password. The computer intercepts the message from a sender before the message reaches the intended recipient. The computer is unable to open, decrypt, unpack or decompress the attachment because the computer cannot parse the password properly. The message is modified to render the attachment or embedded file such that the recipient cannot open or cannot see the attachment or embedded file (such as by removing the attachment, obfuscating it, etc.). After the modified message is sent to the recipient from the computer, the computer receives the correct password from the recipient allowing the computer to open, decrypt, decompress, or unpack the attachment and then perform any suitable type of anti-malware scanning, analysis, etc. Once it is determined whether or not the attachment is malicious, the computer takes an action such as delivering the attachment to the recipient or blocking its delivery. Software for performing these steps may be part of an e-mail server, may be part of a mail transfer agent, or may be a module on a separate computer.

In a second embodiment, the method operates upon a stand-alone hardware appliance that is typically located upstream of any e-mail server of an enterprise. The appliance intercepts a message (such as an e-mail message) from a sender before the message reaches the intended recipient; the message includes an attachment that cannot be opened by the appliance because it is protected by a password (even though the password may appear within the message). The appliance modifies the message by rendering the attachment inaccessible to the recipient (such as by removing it) and adds a link to the modified message so that the recipient may respond to the appliance (such as by adding a URL, an e-mail address, a text message just, etc.). Once the modified message is sent to the recipient, the recipient is able to parse the password in the message and then reply and send the actual password back to the appliance. Once received, the appliance is then able to open the password-protected attachment. The appliance may then conduct a malware analysis and download or delete the attachment depending upon the result.

In third embodiment, a computer is able to analyze an attachment to a message or the message itself that has been protected by a password. The computer intercepts the message from a sender before the message reaches the intended recipient. The computer is unable to open, decrypt, unpack or decompress the attachment or message because the computer cannot parse the password properly. The message is modified to render the attachment (or message itself) such that the recipient cannot open or cannot see the attachment or message (such as by removing the attachment, obfuscating it, etc.). The modified message may also include a URL or link so that the recipient may respond to the computer. After the modified message is sent to the recipients mobile device from the computer, the computer receives the correct password from the recipient allowing the computer to open, decrypt, decompress, or unpack the attachment or message and then perform any suitable type of anti-malware scanning, analysis, etc. Once it is determined whether or not the attachment is malicious, the computer takes an action such as delivering the attachment to the recipient or blocking its delivery.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
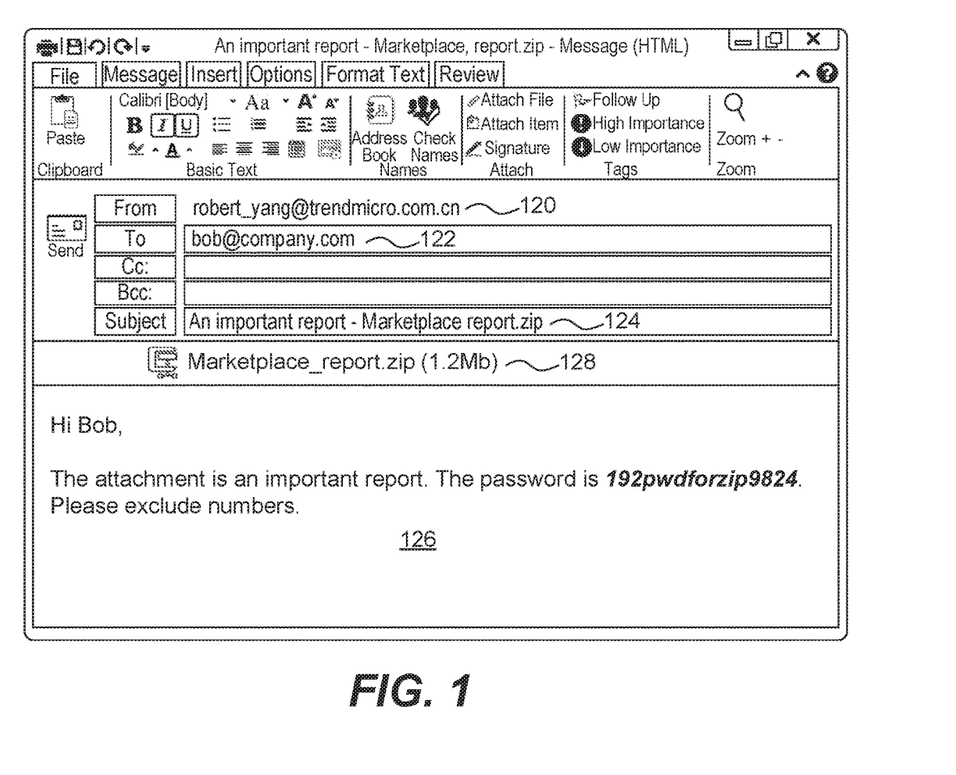
FIG. 1 illustrates an approach in which a password-protected attachment is sent to a recipient.

FIG. 1 illustrates an approach in which a password-protected attachment is sent to a recipient. Shown is a display of an e-mail message 100 having a sender 120, a recipient 122, and a subject 124. The body of the message 126 not only points out that there is an attachment to the message, but also explains what the password is in order to open the attachment. The attachment itself is represented in region 128 and indicates that it is a "Zip" file that requires a password in order to be decompressed. The actual password needed to decompress the file is "pwdforzip" as the explanation in the body informs the recipient to exclude the numerals when entering the password.

In one situation, there is no antivirus software that is automatically screening these messages and message 100 is actually received by a recipient and he or she is then able to directly open the attachment using the password. This situation can be problematic in that if the attachment is malicious then the user has compromised his or her computer by using the password to open the attachment. In another situation, there is antivirus software that has attempted to use the password to open the attachment in order to analyze it, but was unable to open the attachment because the software tried the password "192pwdforzip9824" instead of the actual password "pwdforzip". This other situation is also problematic in that even though there is antivirus software, the software cannot screen the attachment and e-mail message 100 is still delivered to the recipient who may then unknowingly open an attachment that is malicious. Both situations are undesirable because a recipient is allowed to open a malicious attachment.

With this in mind, the inventors have realized that by allowing a recipient to parse a password and its explanation from the body of the message, that the recipient would then be in an advantageous position to provide the password which may then be used by the antivirus software, all before the actual attachment is delivered to the recipient.

Flow Diagrams

Figure 2A:
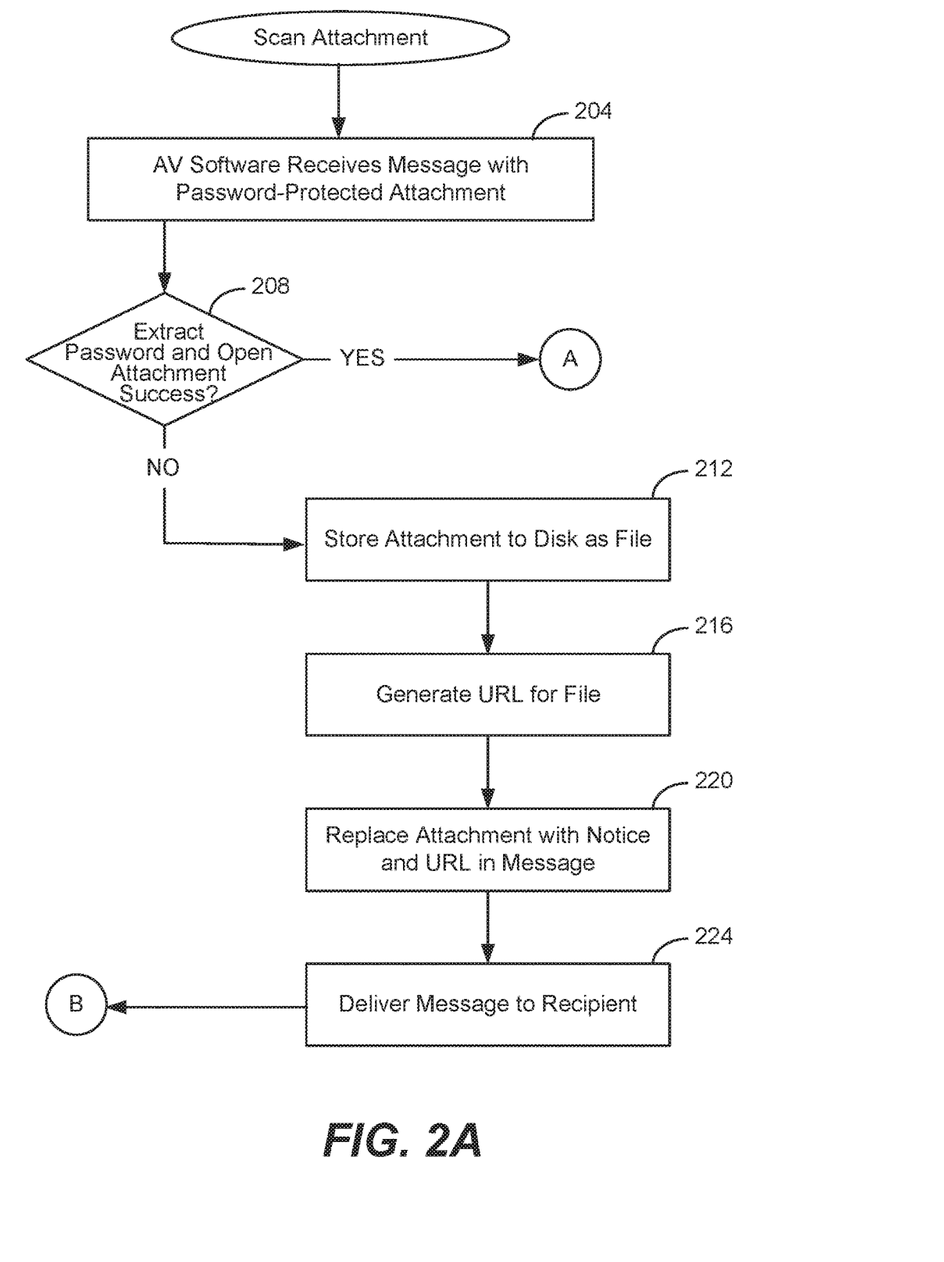
FIGS. 2A and 2B are flow diagrams that illustrate one embodiment by which a password-protected attachment may be opened and analyzed by antivirus software.
Figure 2B:
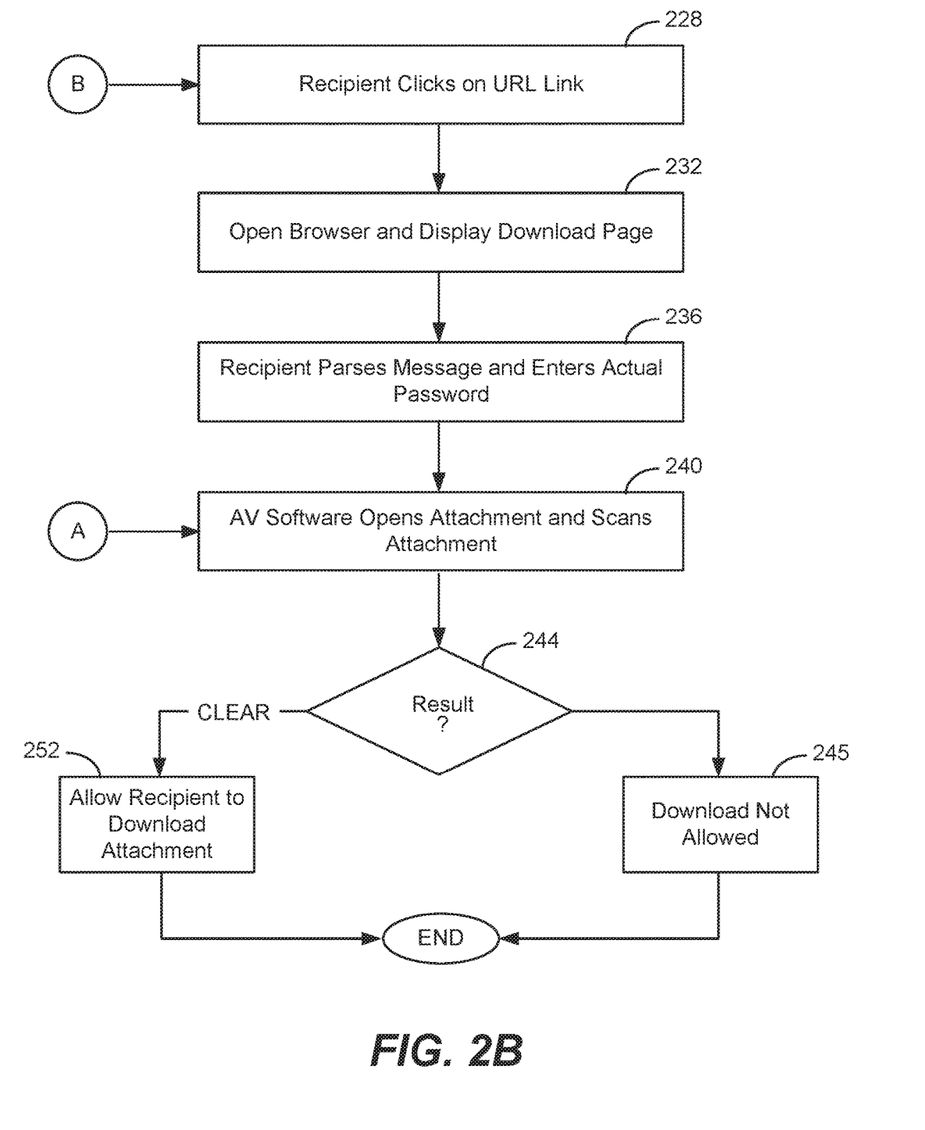

FIGS. 2A and 2B are flow diagrams that illustrate one embodiment by which a password-protected attachment may be opened and analyzed by antivirus software. Even though a particular embodiment involving electronic mail messages and attachments is shown and described in the following figures, the present invention is applicable to most any type of password-protected message, attachment, file, text message, video, image, etc., whether that message is received via a traditional e-mail message, via a text message, via an instant message, via any of a variety of communication applications on a smart phone, via access to Web sites, etc. And, the password-protected file or other may be attached to the message that delivers the file, may be embedded within the message, or may even be the message itself.

Referring again to FIG. 1, message 100 illustrates an e-mail message that has been composed by the sender, including an attachment, an obfuscated password and instructions on how to determine the actual password. The sender sends this e-mail message to the recipient but this message will be intercepted and modified before it is actually received by the recipient.

In step 204 antivirus software receives or intercepts an e-mail message that includes a password-protected attachment. Previously, the e-mail message and its attachment had been sent by a sender who had placed a password upon the attachment such that the recipient would be unable to open, read or execute the attachment unless the password is input. Note that the e-mail message sent has not been delivered to the recipient at this point. The attachment may be a "Zip" file that requires a password in order to decompress its contents, a file protected with a password, a file that has been encrypted and requires a password in order to decrypt the file, any Microsoft Office document needing a password, a PDF file needing a password, any file that has been packed and requires a password in order to unpack the file, an executable file or a Java file needing a password, any Web content needing a password, or some other type of attachment that requires a password before the recipient is allowed to view or execute the attachment.

The antivirus software may be executing upon a dedicated e-mail server computer, upon a stand-alone hardware appliance, or upon another computer that is able to intercept and process the message before it is delivered to the recipient. Also, the antivirus software may be implemented within the mail transfer agent (MTA) or may be a separate software module that interacts with the mail transfer agent. As known in the art, the MTA is software that transfers electronic mail messages from one computer to another; an MTA implements both the client (sending) and server (receiving) portions of the protocol. Of course, the invention is applicable with any of a variety of protocols and in systems where an MTA is not used. The e-mail message and its attachment may be stored locally in memory or in persistent storage for later editing and for eventual forwarding to the recipient.

Figure 3:
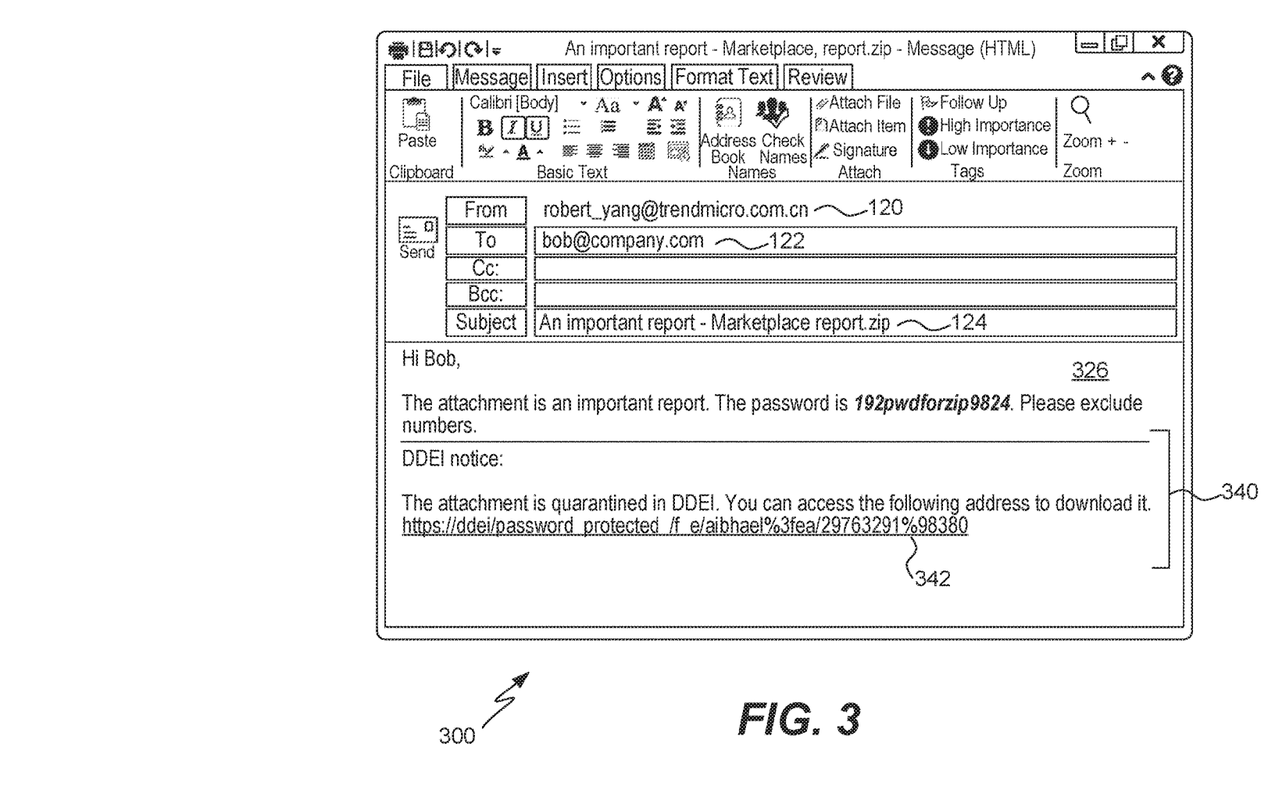
FIG. 3 illustrates an e-mail message that has been edited.

As shown in FIGS. 1 and 3, the sender includes not only the password to open the attachment, but also instructions on what the actual password is. In this example the password and its instructions are included within the body of the e-mail message, although the password or the instructions may be included in other locations such as in the subject line, in another attachment or in location via a URL linked to a Web service. In fact, it is also possible for the password or its instructions to appear in a previous e-mail message or in a later e-mail message, in which case the antivirus software is arranged to store an extracted password from the previous e-mail message or wait to extract the password from the later e-mail message.

In step 208 the antivirus software attempts to extract the password from the e-mail message and open the attachment using the extracted password. A variety of techniques may be used to extract the password; as mentioned above, one technique uses regular expression matching in order to find and extract the password from the body of the e-mail message. Other techniques may also be used. If the sender has provided the password simply by itself with no instructions it is possible that the antivirus software will be successful in extracting the password and opening the attachment. If so, then control moves to step 240 of this flow diagram.

If the antivirus software is not successful in extracting the password and opening the attachment (possibly because the password has been obfuscated as shown in FIGS. 1 and 3) then control moves to step 212 on the assumption that instructions have been provided to determine the actual password and that the antivirus software has been unable to extract the actual password automatically. A sender may attempt to obfuscate a password in a variety of manners. For example, the password may appear as shown in FIGS. 1 and 3 in which the actual password is surrounded with (or includes) superfluous characters or symbols, and the e-mail message includes instructions regarding which are the superfluous characters to exclude. Other examples include: "The password is '1234abcd'. Please replace "3" with "e", and replace "a" with the @ symbol;" and "The password is 'abcdefg'. Please change a, d, g to uppercase." Or, the password may be shown within an image or photograph that software is unable to parse. Or, parts of the password may appear at different places within the e-mail message along with instructions on how to reassemble the parts into the correct password. Or, a simple question is used to supply the password, e.g., "On which planet are we?" (answer: Earth."). Another technique is to render the password or the instructions in an audio file that the recipient must listen to in order to determine actual password. And, another technique is to provide text such as "Please click this URL to obtain the password," along with a link to the password.

In step 212 the antivirus software stores the password-protected attachment into persistent storage for later access. The attachment may be stored onto the dedicated hardware appliance, onto the e-mail gateway server, or onto any other suitable computing device that can later be accessed. The attachment is preferably stored using the same type as the attachment. For example, if the attachment is a PDF file it is stored as a PDF file, if the attachment is a WORD document it is stored as a WORD document, etc. Optionally, at this time a unique identifier may be calculated for the file such as its hash value. This unique identifier is used to uniquely identify the file for later access. Other techniques for identifying the file such as by using its original name, placing it into a specific folder, etc., may be used if a unique identifier is not necessary.

In step 216 the antivirus software generates a URL for the file, identifying the file by the unique identifier calculated above in step 212 or by another name. In one particular embodiment, the URL does not open the attachment directly when selected, rather the URL identifies a particular Web page that may provide access to the attachment, as will be explained in greater detail below with reference to FIG. 4. The URL thus identifies a location that provides access to this file and may be used in the future to access or download the file. Other techniques may be used to access the file at a later time.

In step 220 the antivirus software takes the original e-mail message 100 received in step 204 and edits it by first removing the attachment, and second by adding the URL generated above. Depending upon whether the message received in step 204 is actually an e-mail message, or is another type of communication such as a text message, an instant message, a mobile application communication, a Web site or Web page accessible by both the sender and recipient, etc., this editing may take different forms.

FIG. 3 illustrates an e-mail message 300 that has been edited according to step 220. Similar to original message 100, edited message 300 includes the same sender 120, recipient 122 and subject 124. But, attachment 128 has been removed from the message so that the recipient may not open the attachment before it has been analyzed by the antivirus software. Region 340 has also been added to message 300 and includes a notice informing the recipient that the attachment has been quarantined and that the recipient may access the attachment by clicking on link 342. Of course, other types of edits may be made to the original message 100. For instance, instead of removing the attachment the message may be edited so that even though the attachment it is visible it may not be opened or executed (i.e., clicking upon it has no effect). Or, region 128 instead of including the actual attachment may include link 342. Or, there may be no notice in region 340, only link 342.

In step 224 edited message 300 is delivered to the recipient in the normal fashion. For example, message 300 is released from quarantine by the antivirus software and delivered to the MTA on the recipient's e-mail server so that the MTA may deliver it to the recipient's inbox. Of course, other e-mail delivery options may be used. When delivered, the message may appear as shown in FIG. 3. Note that the recipient at this point cannot open the attachment because it has not yet been analyzed by the antivirus software.

Figure 4:
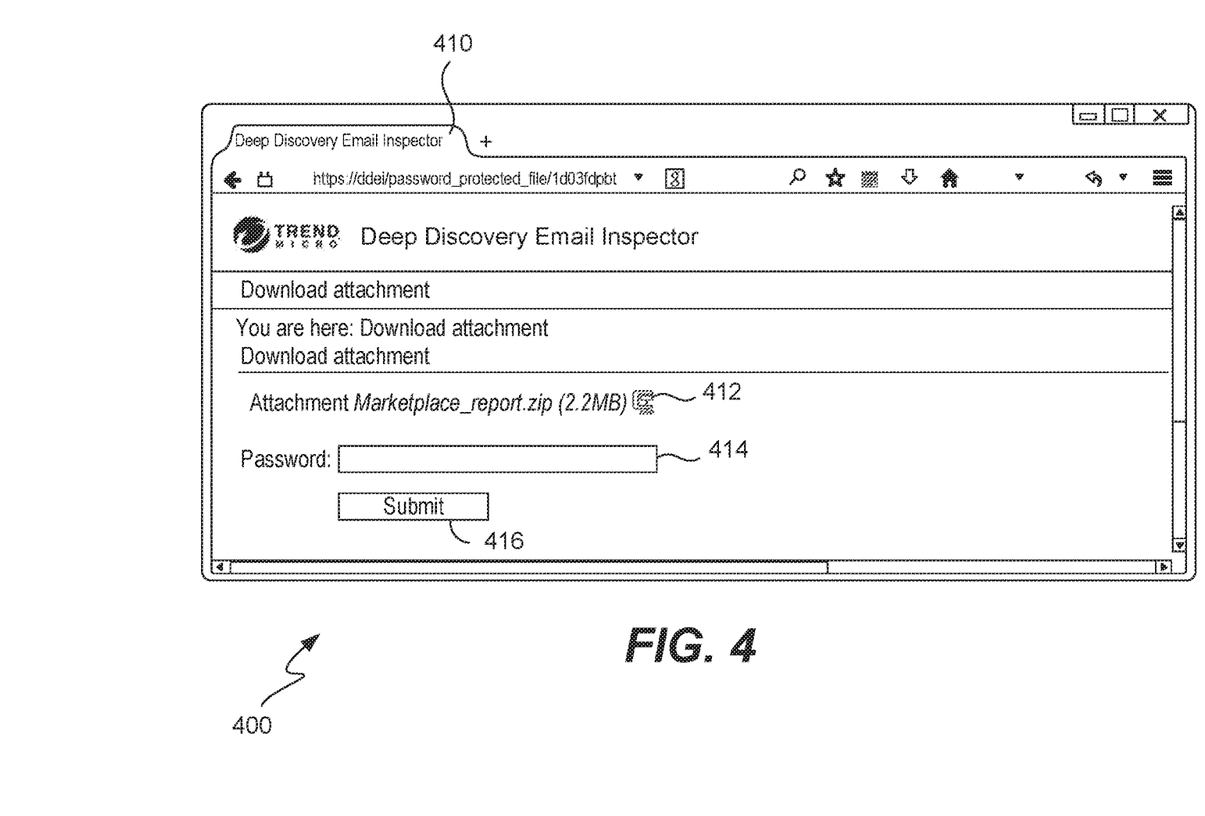
FIG. 4 illustrates a page within a browser displayed on the recipient's computer.

FIG. 4 illustrates a page within a browser displayed on the recipient's computer in conjunction with steps 228-236. In step 228 the recipient clicks on link 342 and then in step 232 a browser opens on the recipient's computer and displays a particular download page identified by Link 342. As shown in FIG. 4, the browser includes a tab 410 having a particular URL and indicates the name of the attachment 412 from the original e-mail message 100 along with a password field 414 and a Submit button 416. Preferably, the Web page shown in FIG. 4 and identified by the URL of tab 410 is hosted by the standalone hardware appliance that also hosts the antivirus software. Of course, it is possible that this Web page may be hosted on a different computer which holds the stored attachment.

Clicking on the link in step 228 may open a download page such as shown in FIG. 4 in a variety of manners. As known in the art, clicking on a hyperlink within a document or e-mail message may automatically open a browser (or may open a new tab within an already opened browser) on the recipient's computer. On other devices clicking on the link may open a new window of an application, a new page on the device, etc.

Next, in step 236 the recipient is able to enter the actual password in field 414. Unlike a software program, the recipient is able to read message body 326 of the edited message 300 and is able to parse that message, and thus able to determine the actual password. If the password has been obfuscated in other manners, the recipient is able to piece together various parts of the password, is able to discern the password from an image, is able to listen to an audio file, or is able to perform other tasks in order to determine the actual password. Once the actual password has been entered the recipient clicks the Submit button 416 and the information is sent to the antivirus software.

In step 240 the antivirus software reads the password in field 414 entered by the recipient and attempts to open the attachment using this password. If the password is not correct Web page 400 may be displayed again to the user or another suitable warning reminder may be presented. Assuming the password is correct, the antivirus software is then able to analyze the attachment in a variety of manners to determine whether it is malicious or not. As is known in the art, antivirus software uses a variety of techniques to detect malware. For instance, traditional malware detection scan engines and virus patterns may be used to analyze the attachment, Sandbox simulation and analysis may be performed, document exploit detection is available, embedded URL analysis may be done, etc. Once the analysis has been performed, a result is determined in step 244.

Figure 5:
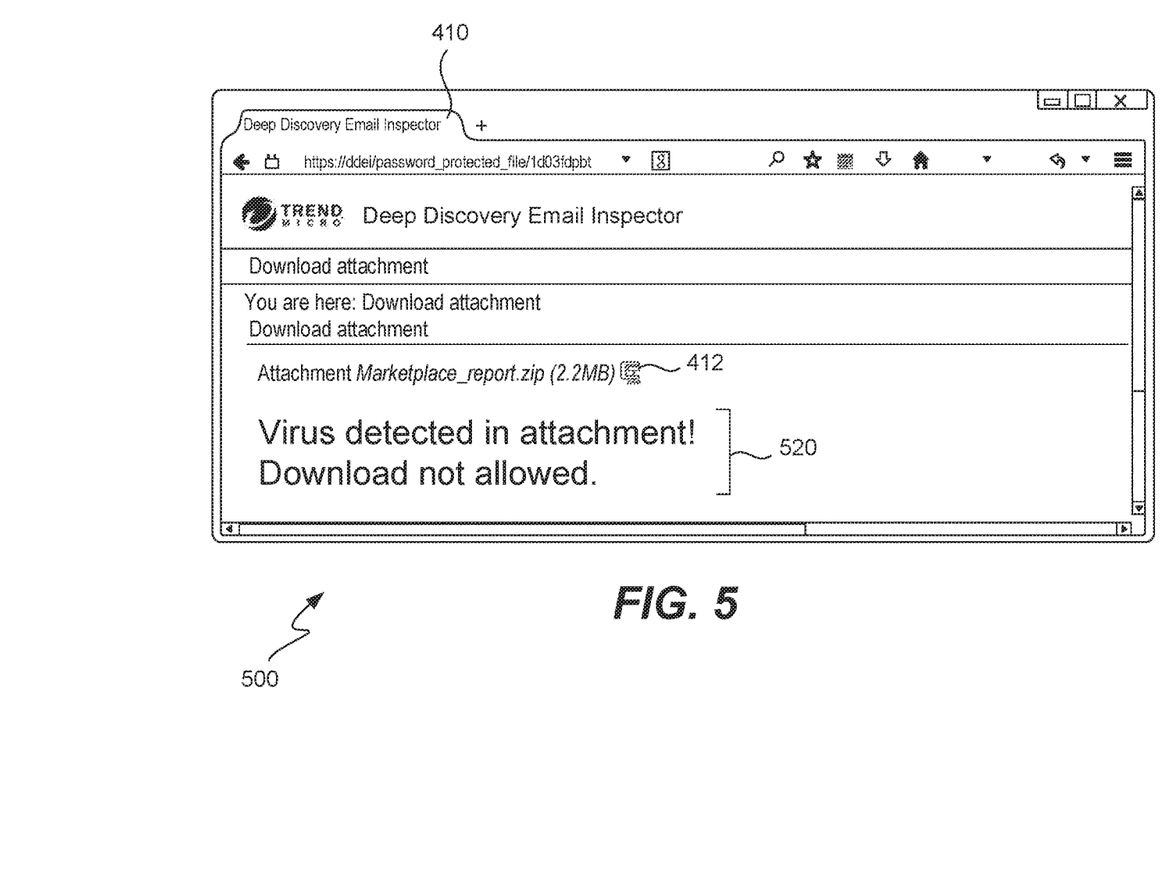
FIG. 5 illustrates a Web page informing the user that the attachment includes malware.

FIG. 5 illustrates a Web page 500 informing the user that the attachment includes malware. If malware has been detected within the attachment then in step 248 the recipient is not allowed to download, open or execute the attachment and a warning message may be displayed as shown in FIG. 5. Shown is a tab 410 including the name of the attachment 412 and a warning message 520. Other actions may also be taken such as blocking the attachment, further quarantining the attachment, deleting the attachment from the e-mail server, forwarding the message with tagging, etc.

Figure 6:
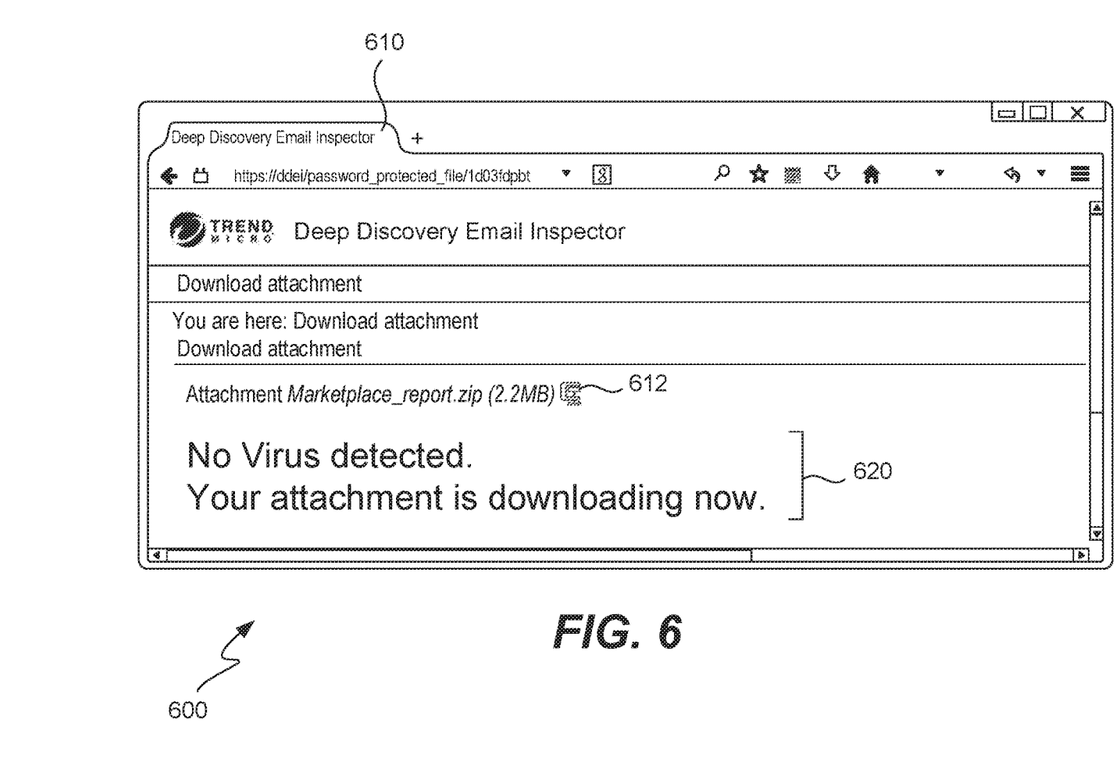
FIG. 6 illustrates a Web page informing the user that the attachment does not include malware.

FIG. 6 illustrates a Web page 600 informing the user that the attachment does not include malware. If malware has not been detected then the recipient is allowed to download the attachment, open the attachment or execute the attachment if it is an executable file. Shown is a tab 610 including the name of the attachment 612 and an informational message 620. The attachment may be downloaded to the recipient's computer via the browser in ways known to those of skill in the art. Or, the antivirus software may send the original message 100 to the recipient at this point now that the attachment has been deemed to be free of malware. Or, the recipient may now be allowed to access the attachment on a particular Web site, or in other ways depending upon the nature of the original communication to the recipient.

Specific Embodiment

Figure 7:
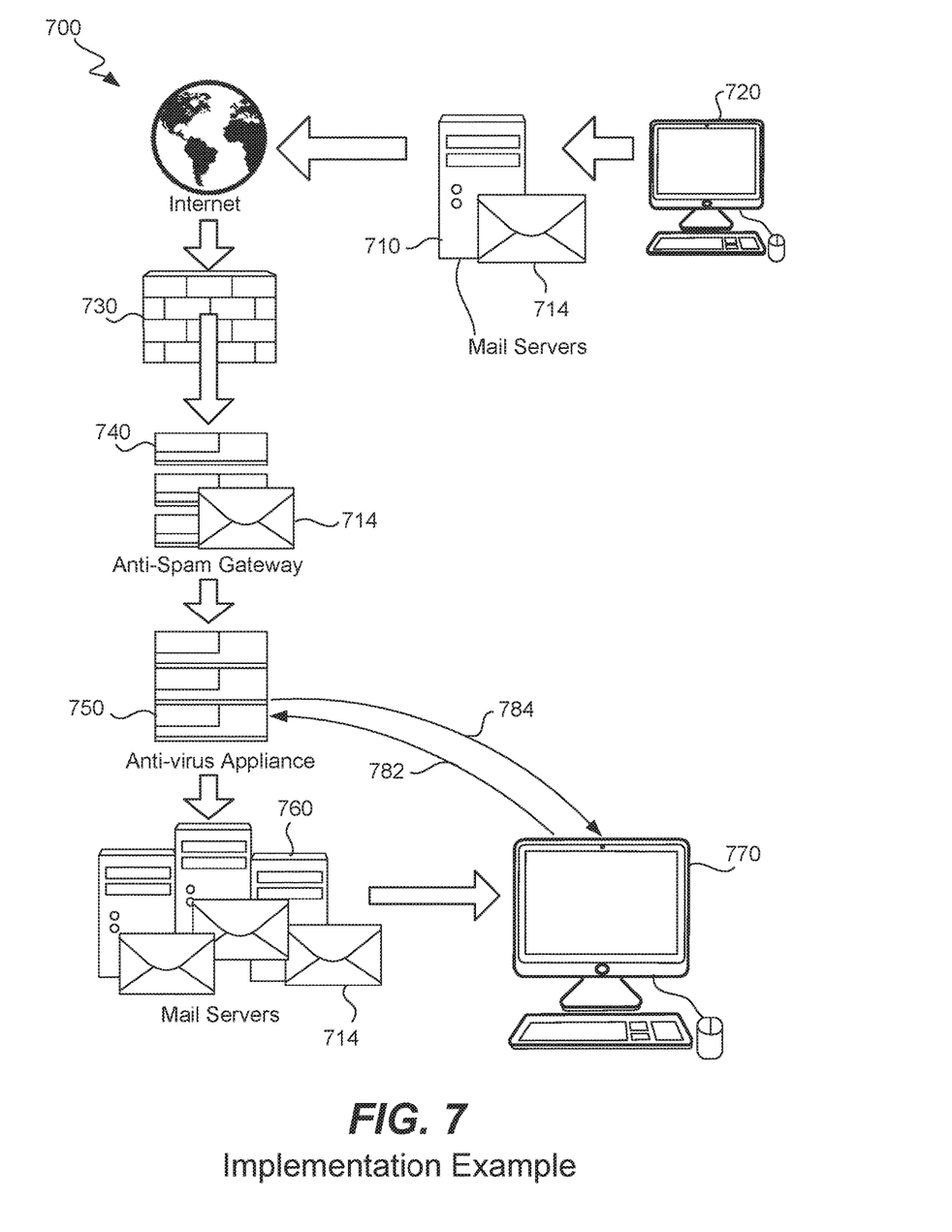
FIG. 7 is a block diagram illustrating a specific implementation.

FIG. 7 is a block diagram illustrating a specific implementation 700 in which the present invention may be implemented. Shown is an e-mail server 710 and a user computer 720 located within an enterprise connected to the Internet. In this example a user at computer 720 composes and sends e-mail message 714 that includes a password-protected attachment which may or may not be malicious. Of course, it is possible that message 714 emanates from a single user and not from any particular enterprise.

In this example, hardware components 730-770 are within the domain of an enterprise. Optional components that are often standard within an enterprise include a firewall 730 and an anti-spam gateway 740. Hardware component 750 is a standalone antivirus appliance that includes software modules and storage for implementing the above-described flow diagrams and embodiments of the invention. Three such appliances are shown although there may be only one. E-mail server 760 includes a mail transfer agent (MTA) (or other e-mail processing software) arranged to receive e-mail message 714 and forward it on to the recipient at user computer 770. E-mail message 714, after passing through optional firewall 730 and gateway 740, is intercepted at antivirus appliance 750 and processed as described above before being released to e-mail server 760. Although not shown, it is possible that a user at computer 770 composes and sends an e-mail message back through the hardware components shown to computer 720.

Implementation of any of steps 228-236 and 252 is shown as communication links 782 and 784 in which user computer 770 sends information to the antivirus appliance 750 and receives information in return. For example, in step 228 the recipient clicks on the URL link in the edited message and requests the Web page from the antivirus appliance. In step 232 a download page from the appliance is sent to and displayed on the user computer, and in step 236 the password entered by the recipient is transmitted back to the appliance. When implemented, the appliance name "ddei" as shown in the URL of tab 410 of FIG. 4 would be replaced with the IP address of antivirus appliance 750.

In this specific embodiment, the antivirus software is the Deep Discovery E-Mail Inspector (DDEI) software product available from Trend Micro Inc. that executes upon a stand-alone hardware appliance such as a 1U rack mount appliance. The product may be deployed in a number of modes including an MTA (blocking) mode and a BCC (monitoring) mode. As shown, appliance 750 works in tandem with any e-mail gateway or e-mail server and requires no changes to a normal operating environment.

Specific Mobile Embodiment

In an embodiment in which e-mail messages and the like are sent from computer 720 and are processed by antivirus appliance 750, the end user device 770 may be a mobile telephone, mobile tablet computer, or similar.

In a different embodiment, the information or message sent from computer 720 (which may be a traditional computer, or a mobile device) may be a text message intended for device 770 which is a mobile telephone, may be an instant message, may be a message for use with an application on the mobile telephone such as Instagram, Snapchat, WhatsApp, etc. The attachment may be any attachment attached to any of these messages (including a photograph or video) or may be part of or constitute the message itself. In order to provide a password from the recipient's mobile device back to the antivirus appliance, the recipient may click on a URL link on the mobile device as described above, or the user may send a text message or similar back to the antivirus appliance.

Computer System Embodiment

Figure 8A:
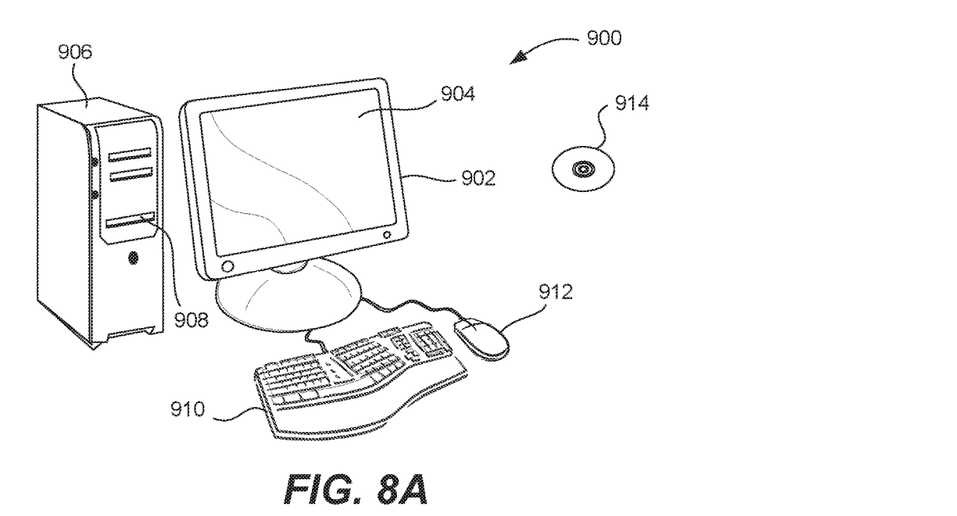
FIGS. 8A and 8B illustrate a computer system suitable for implementing embodiments of the present invention.
Figure 8B:
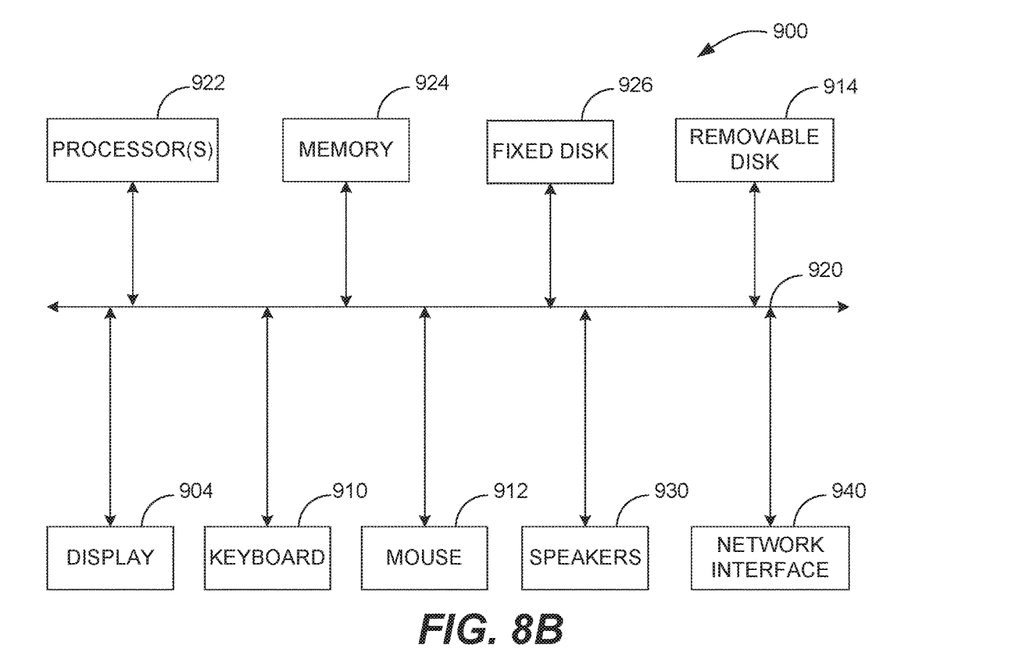

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. In a computer, a method of analyzing an attachment, said method comprising:
   intercepting a message from a sender by an antivirus software before said message reaches the intended recipient, said message including a password-protected attachment having an associated obfuscated password to open said attachment in a message body of the message;
   quarantining said attachment;
   generating a modified message in which the attachment is removed from the modified message and with the modified message including at least a portion of the message body containing the obfuscated password and a request for the intended recipient to provide the unobfuscated password;
   sending the modified message to said recipient;
   receiving, by the anti-virus software, said unobfuscated password from said recipient;
   analyzing said quarantined attachment with the use of said unobfuscated password to determine if said attachment includes malware; and
   taking an action with regard to said attachment based upon said analysis, including:
   1) in response to determining that said attachment is not malicious, downloading said attachment to a computer of said recipient or allowing said recipient to access said attachment; and
   2) in response to determining that said attachment is malicious, not allowing said recipient to have access to said attachment.

2. The method as recited in claim 1 wherein said quarantining comprises:
   storing a copy of said attachment; and
   removing said attachment from said message before said sending.

3. The method as recited in claim 1, wherein generating said modified message comprises:
   removing said attachment from said message; and
   inserting a URL of said computer into said modified message before said sending said modified message, wherein said URL identifies a page for said recipient to provide said unobfuscated password to said computer.

4. The method as recited in claim 3, wherein said page includes said at least the portion of the message body containing the obfuscated password.

5. The method as recited in claim 1, further comprising attempting, by said antivirus software, to extract said unobfuscated password from said obfuscated password.

6. The method as recited in claim 5, wherein said modified message is generated and sent in response to said antivirus software failing to extract said unobfuscated password from said obfuscated password.

7. The method as recited in claim 1, wherein said obfuscated password cannot be parsed by said antivirus software.

8. In a computer, a method of analyzing an attachment, said method comprising:
   intercepting a message from a sender before said message reaches a recipient mobile device, said message including a password-protected attachment having an associated obfuscated password, within the message, to open said attachment:
   storing said attachment;
   generating a modified message in which the attachment is removed from the modified message and with the modified message including at least a portion of the message body containing the obfuscated password and notifying the intended recipient to provide the unobfuscated password;
   sending the modified message to said intended recipient;
   receiving said unobfuscated, password from said recipient mobile device;

analyzing said attachment with the use of said password to determine if said attachment includes malware; and sending said password-protected attachment to said recipient mobile device if said attachment does not include malware.

9. The method as recited in claim 8, wherein said modified messages comprises a URL that identifies a page for the intended recipient to provide the unobfuscated password.

\* \* \* \* \*